(12) United States Patent
Whitham et al.

(10) Patent No.: US 8,039,037 B2
(45) Date of Patent: Oct. 18, 2011

(54) MULTI-TEXTURED READY-TO-EAT CEREAL WITH EXTRUDED RICE PELLETS

(75) Inventors: James Whitham, Cheshire (GB); Wolfgang Demelt, Bremen (DE); Paul Neumann, Richland, MI (US); Brinda Govindarajan, Battle Creek, MI (US); Viswas M. Ghorpade, Portage, MI (US); Tamila Williams, Richland, MI (US)

(73) Assignee: Kellogg Company, Battle Creek, MI (US)

( * ) Notice: Subject to any disclaimer, the term of this patent is extended or adjusted under 35 U.S.C. 154(b) by 323 days.

(21) Appl. No.: 12/414,110

(22) Filed: Mar. 30, 2009

(65) Prior Publication Data
US 2010/0247717 A1 Sep. 30, 2010

(51) Int. Cl.
*A23L 1/164* (2006.01)

(52) U.S. Cl. ........ 426/621; 426/560; 426/618; 426/619; 426/620

(58) Field of Classification Search .................. None
See application file for complete search history.

(56) References Cited

U.S. PATENT DOCUMENTS

| | | | |
|---|---|---|---|
| 2,975,058 A | 3/1961 | Colarusso | |
| 3,054,676 A | 9/1962 | Lauhoff et al. | |
| 3,062,657 A | 11/1962 | Vollink | |
| 4,073,958 A | 2/1978 | Abe | |
| 4,325,976 A | 4/1982 | Harrow et al. | |
| 4,769,251 A | 9/1988 | Wenger et al. | |
| 5,110,613 A | 5/1992 | Brown et al. | |
| 5,188,860 A | 2/1993 | Hemann et al. | |
| 5,366,749 A | 11/1994 | Frazee et al. | |
| 5,372,826 A | 12/1994 | Holtz et al. | |
| 5,510,130 A | 4/1996 | Holtz et al. | |
| 6,171,631 B1 | 1/2001 | Willoughby et al. | |
| 6,291,008 B1 | 9/2001 | Robie et al. | |
| 6,303,177 B1 | 10/2001 | Ning et al. | |
| 6,319,534 B1 | 11/2001 | Willoughby et al. | |
| 7,235,276 B2 | 6/2007 | Allen et al. | |
| 7,250,186 B2 | 7/2007 | Pfaller et al. | |
| 7,413,760 B2 | 8/2008 | Green et al. | |
| 2003/0035864 A1 | 2/2003 | Meschewski et al. | |
| 2005/0064080 A1 | 3/2005 | Creighton et al. | |
| 2008/0020112 A1 | 1/2008 | Pfaller et al. | |
| 2008/0181991 A1 | 7/2008 | Schopf et al. | |

FOREIGN PATENT DOCUMENTS

EP 0626138 A1 11/1994

OTHER PUBLICATIONS

International Search Report Dated Apr. 14, 2010; 4 Pages.

*Primary Examiner* — Lien Tran
(74) *Attorney, Agent, or Firm* — Dickinson Wright PLLC

(57) ABSTRACT

A multi-textured ready-to-eat cereal flake includes a plurality of rice based pellets embedded in a cooked cereal grain. The plurality of rice pellets are formed from a rice product and have a first moisture content. A cooked cereal grain mixture is then formed and has a second moisture content that is greater than the first moisture content of the rice pellets. The plurality of rice pellets are then embedded within the cooked cereal grain mixture to create a multicomponent mixture. A multicomponent pellet is formed from the multicomponent mixture. The multicomponent pellet is then formed into a flake. The flake is heated to create a multi-textured flake. Based on the moisture differential between the cooked cereal grain and the plurality of rice pellets, the plurality of rice pellets expand to create a blistered appearance on the multi-textured flake.

32 Claims, 2 Drawing Sheets

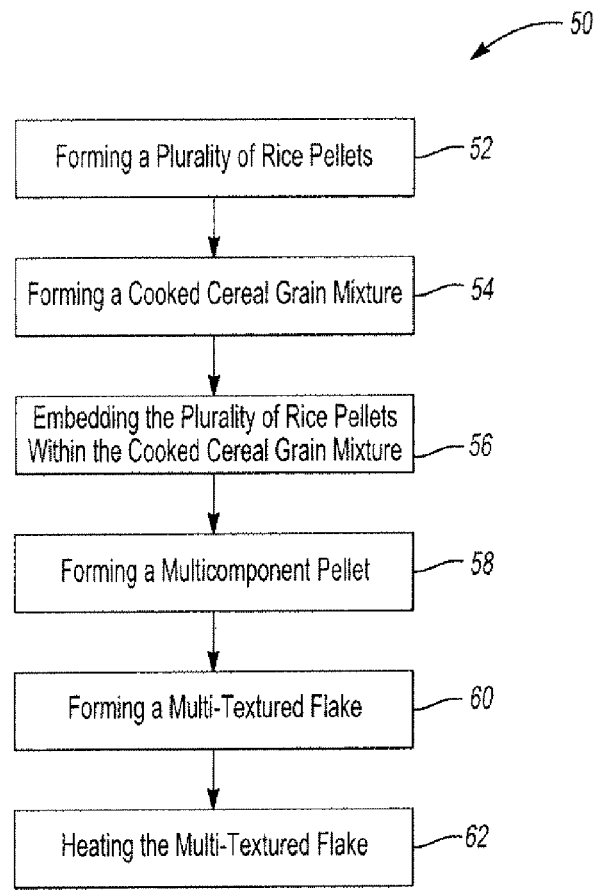
*Fig-2*
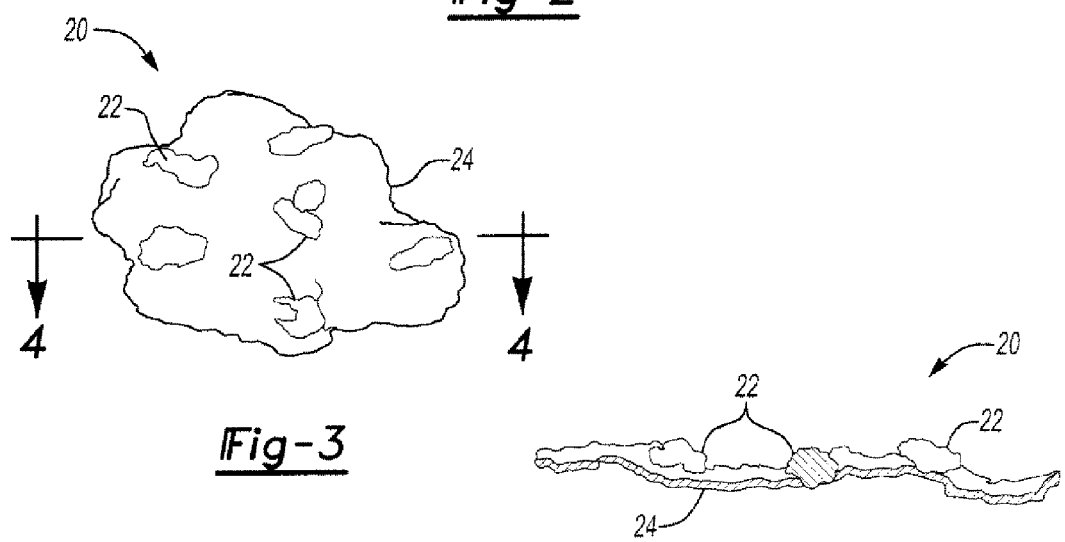
*Fig-3*
*Fig-4*

MULTI-TEXTURED READY-TO-EAT CEREAL WITH EXTRUDED RICE PELLETS

BACKGROUND OF THE INVENTION

1. Field of the Invention

The present invention relates to a multi-textured ready-to-eat cereal flake, more particularly to a multi-textured ready-to-eat cereal flake having a plurality of rice pellets embedded therein and a method of making the same.

2. Description of the Prior Art

Multi-textured ready-to-eat cereal flakes are known in the art. U.S. Pat. No. 5,510,130 to Holtz et al. discloses a process for combining two streams of extruded products for forming a multi-textured ready-to-eat cereal flake. To begin, a cooked cereal dough product is formed. Next, an edible matter, such as oat, wheat, barley and corn, is introduced into the cooked cereal dough to form a secondary cereal dough product having the edible matter embedded therein. The secondary cereal dough is then converted into flakes, which are toasted to form the multi-textured ready-to-eat cereal product.

In addition, U.S. Pat. No. 7,413,760 to Green et al. discloses a multi-textured ready-to-eat cereal flake comprising a cooked cereal grain and a parboiled medium grain rice. Preparing parboiled rice requires long cooking times and additional processing steps thus resulting in additional manufacturing cost and time. Further, the parboiled rice requires a whole grain to be added to the parboiled rice to minimize the viscosity of the parboiled rice and whole grain mixture so as to help maintain the piece identity of the parboiled rice.

SUMMARY OF THE INVENTION AND ADVANTAGES

The subject invention relates a multi-textured ready-to-eat cereal flake having a plurality of rice based pellets embedded in a cooked cereal grain. The plurality of rice pellets are formed from a rice product and have a first moisture content. A cooked cereal grain mixture is then formed and has a second moisture content that is greater than the first moisture content of the rice pellets. The plurality of rice pellets are then embedded within the cooked cereal grain mixture to create a multicomponent mixture. A multicomponent pellet is formed from the multicomponent mixture, which is then formed into a flake. The flake is heated to create a multi-textured flake. Based on the moisture differential between the cooked cereal grain and the plurality of rice pellets embedded therein, the plurality of rice pellets expand to create a blistered appearance on the multi-textured flake.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is simplified flow diagram illustrating the steps of an exemplary embodiment of the invention;

FIG. 3 is a top view of a multi-textured ready-to-eat cereal flake produced in an exemplary embodiment of the subject invention; and FIG. 4 is a cross-sectional view of the multi-textured ready-to-eat cereal flake shown in FIG. 3 along the line 4-4.

DETAILED DESCRIPTION OF THE INVENTION

Figure 1:
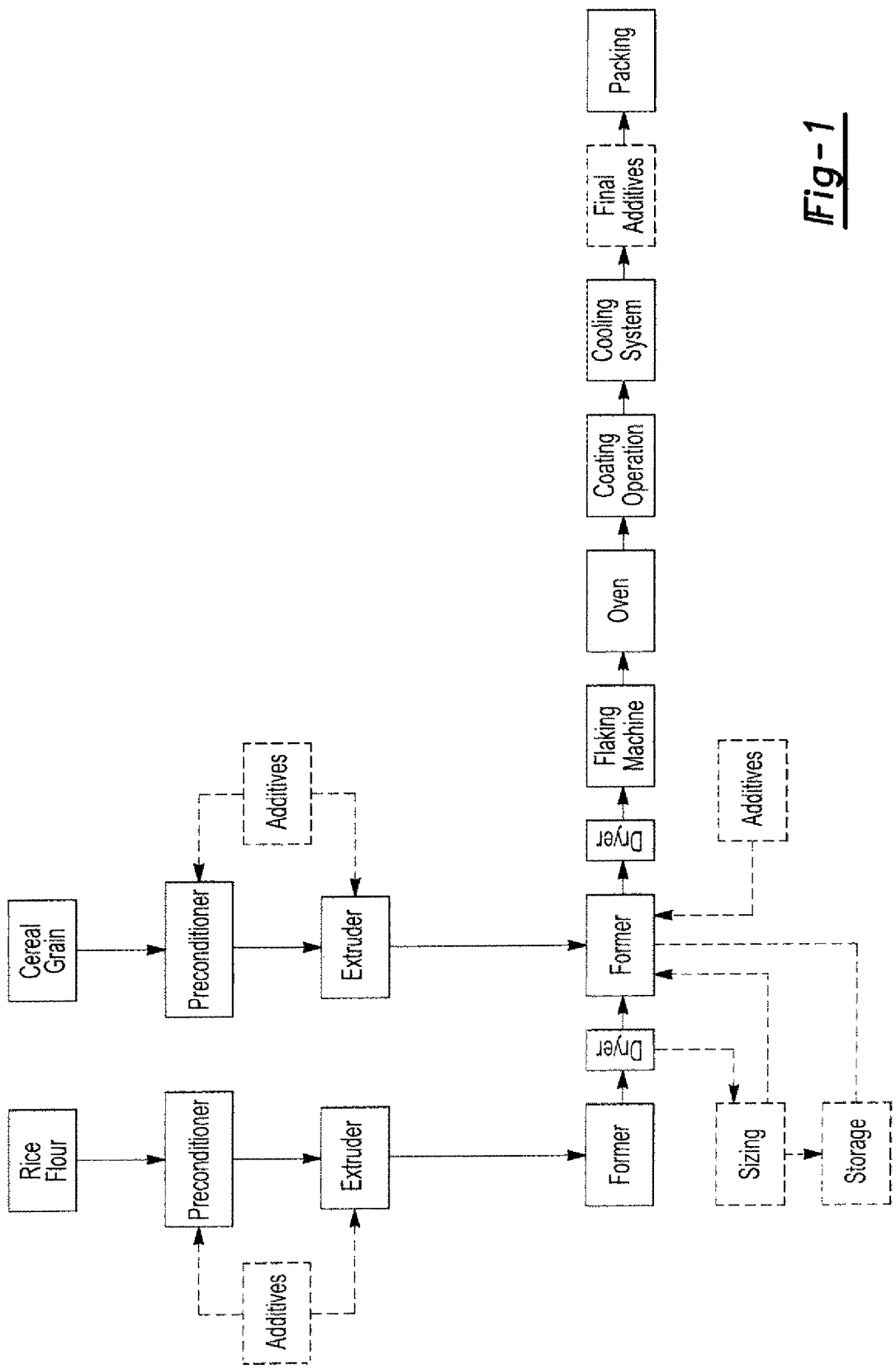
FIG. 1 is a schematic for a process to produce the multi-textured ready-to-eat cereal flake according to an exemplary embodiment of the invention.

Referring to the Figures, wherein like numerals indicate corresponding parts throughout the several views, a multi-textured ready-to-eat cereal flake 20 having a plurality of rice pellets 22 embedded therein is generally shown.

A multi-textured ready-to-eat cereal flake 20 includes a plurality of rice pellets 22 having a first moisture content prior to heating. The rice pellets 22 are made from a rice product, including but not limited to rice flour. The plurality of rice pellets 22 are embedded within a cooked cereal grain mixture 24. The cooked cereal grain mixture 24 has a second moisture content that is greater than the first moisture content of the rice pellets 22 prior to heating. The cooked cereal grain is one of at least wheat, corn, rice, barley or any other cereal grain known in the art. The rice pellets 22 expand during heating to create a blistered appearance on the multi-textured flake 20.

A method of preparing a multi-textured ready-to-eat cereal flake 20 according to an exemplary embodiment is shown schematically in FIG. 1 and in the flow diagram of FIG. 2. As shown in FIG. 2, the method 50 begins at step 52 where a plurality of rice pellets 22 are formed from a rice product and have a first moisture content. The rice product is a rice flour, such as a Turkish rice flour, but may be any rice flour in the art. Next in step 54, a cooked cereal grain mixture 24 having a second moisture content greater than the first moisture content is formed. The plurality of rice pellets 22 are embedded within the cooked cereal grain mixture 24 to create a multi-component mixture in step 56. Next in step 58, a multicomponent pellet is formed from the multicomponent mixture. A flake 20 is formed from the multicomponent pellet in step 60. Next in step 62, the flake 20 is heated to create a multi-textured ready-to-eat cereal flake 20. The plurality of rice pellets 22 expand during heating to create a blistered appearance on the multi-textured ready-to-eat cereal flake 20.

The plurality of rice pellets 22 are formed in step 52 by first disposing rice flour and water into a mixer or preconditioner to form a rice mixture. In the exemplary embodiment, the preconditioner is of the type commonly available from, for instance, Buhler, but may be any preconditioner known in the art. The rice mixture typically comprises from about 1-100% by weight of the rice pellet 22, and preferably from about 20-95% by weight of the rice pellet 22. At least one rice mixture additive may be added to the rice mixture in the preconditioner. Additives may be added to provide flavor as well as texture and include, but are not limited to, malt, flavoring, coloring, sugar, sweetening agents, salt, texturing agents, preservatives, lubricants and the like. Other additives that can be included in the composition of the present invention will be readily apparent to those skilled in the art.

The rice mixture may contain water. The water content of the rice mixture is preferably in the range of from about 10-40%. The water content contributes to the thermoplasticity of the composition during the extrusion process. Optimum water content will vary with the particular ingredients used, but the overall water content is preferably within the aforementioned range. The water content can be adjusted as desired, and the inclusion of certain ingredients, e.g. oils, allow the rice mixture to be used at a lower water content than a composition without such ingredient(s). For example, if a vegetable oil is added to the rice mixture, the water content can be reduced relative to the water content of the composition without the oil. Oil also has the added benefit of providing lubrication which assists in moving the rice mixture through the extruder. Suitable oils include any edible oils such as cottonseed oil, vegetable oils such as corn oil, and the like.

The rice mixture is then transferred to an extruder. While the process of the invention can be carried out in a single screw extruder, the extrusion system preferably includes a twin screw extruder of the type commonly available from, for instance, Buhler. The rice mixture is cooked at a moisture content of about 20-30%. The rice mixture may be cooked using an extruder, rotary cooker, or any other method known in the art for cooking rice. The at least one rice mixture additive may be added to the rice mixture in the extruder.

In the exemplary embodiment, the rice mixture is blended and cooked in an extrusion system. The blending can be controlled by varying the mixing intensity within the extrusion chamber. The mixing intensity can give rise to shearing stresses causing rheological changes in the rice mixture. Simultaneously, the rice mixture is cooked at a temperature in the range of 70-250° F. for a period of 1-2 minutes to provide a fully, or at least substantially fully, cooked rice mixture.

Next, the rice mixture is transferred to a former. In the exemplary embodiment, the former is of the type commonly available from, for instance, Buhler, but may be any former known in the art. The rice mixture may be transfer to the former by any method of transferring mixtures known in the art. In an exemplary embodiment, the rice mixture is transferred by moving the rice mixture to the former through a tube, such as a hot tube. The hot tube may further cook the rice mixture by increasing the resident time. In an alternative embodiment, the rice mixture may be transferred by feeding a rope of the rice mixture from the exit of the extruder to the opening of the former placed in parallel. In yet another alternative embodiment, the rice mixture may be cut into segments and transferred along a conveyor to the former.

The rice mixture is then formed into the plurality of rice pellets 22. The formed rice pellets 22 have a moisture content of about 15-20%. In the exemplary embodiment, the rice pellets 22 are formed by cutting the extrudate of rice mixture exiting the former, but the pellets may be formed by any method known in the art of forming pellets. The plurality of rice pellets 22 are then dried to a moisture content of about 9-13%, preferably of about 10-12% by weight. The rice pellets 22 may be dried by any method known in the art. Optionally, the plurality of rice pellets 22 may then be sized to a desired shape and size. The plurality of pellets may be sized by any method of sizing pellets known in the art. The rice pellets 22 are then stored for future use.

In step 54, the cooked cereal grain mixture 24 is formed by disposing at least one cereal grain into a cereal grain mixer or preconditioner to form a cereal grain mixture. In the exemplary embodiment, the preconditioner is of the type commonly available from, for instance, Buhler, but may be any preconditioner known in the art. The preconditioner may be the same preconditioner used to mix the rice mixture or its own separate preconditioning unit. The at least one cereal grain includes, but is not limited to, at least one of wheat, corn, rice, barley, or any other cereal grain known in the art. At least one cereal grain mixture additive may be added to the cereal grain mixture. Additives may be added to provide flavor as well as texture and include, but are not limited to, malt, flavoring, coloring, sugar, sweetening agents, salt, texturing agents, preservatives, lubricants and the like. Other additives that can be included in the composition of the present invention will be readily apparent to those skilled in the art.

The cereal grain mixture may contain water. The water content of the cereal grain mixture is preferably in the range of from about 10-40%. The water content contributes to the thermoplasticity of the composition during the extrusion process. Optimum water content will vary with the particular ingredients used, but the overall water content is preferably within the aforementioned range. The water content can be adjusted as desired, and the inclusion of certain ingredients, e.g. oils, allow the cereal grain mixture to be used at a lower water content than a composition without such ingredient(s). For example, if a vegetable oil is added to the cereal grain mixture, the water content can be reduced relative to the water content of the composition without the oil. Oil also has the added benefit of providing lubrication which assists in moving the cereal grain mixture through the extruder. Suitable oils include any edible oils such as cottonseed oil, vegetable oils such as corn oil, and the like.

The cereal grain mixture is then transferred to an extruder. While the process of the invention can be carried out in a single screw extruder, the extrusion system preferably includes a twin screw extruder of the type commonly available from, for instance, Buhler. The extruder may be same extruder used to cook the rice mixture. The cereal grain mixture is cooked at a moisture content of about 20-30%. The cereal grain mixture may be cooked using an extruder, rotary cooker, or any other method known in the art for cooking cereal grain. The at least one cereal grain mixture additive may be added to the cereal grain mixture in the extruder.

In the exemplary embodiment, the cereal grain mixture is blended and cooked in an extrusion system. The blending can be controlled by varying the mixing intensity within the extrusion chamber. The mixing intensity can give rise to shearing stresses causing rheological changes in the cereal grain mixture. Simultaneously, the cereal grain mixture is cooked at a temperature in the range of 70-250° F. for a period of 1-2 minutes to provide a fully, or at least substantially fully, cooked cereal grain mixture 24.

The cooked cereal grain mixture 24 is then transferred to a former. In the exemplary embodiment, the former is of the type commonly available from, for instance, Buhler, but may be any former known in the art. The former may be the same former used to form the plurality of rice pellets. The cooked cereal grain mixture 24 may be transfer to the former by any method of transferring mixtures known in the art. In an exemplary embodiment, the cooked cereal grain mixture 24 is transferred by moving the cooked cereal grain mixture 24 to the former through a tube, such as a hot tube. The hot tube may further cook the cereal grain mixture by increasing the resident time. In an alternative embodiment, the cooked cereal grain mixture 24 may be transferred by feeding a rope of the cooked cereal grain mixture 24 from the exit of the extruder to the opening of the former placed in parallel. In yet another alternative embodiment, the cooked cereal grain mixture 24 may be cut into segments and transferred along a conveyor to the former.

In step 56, the plurality of nice pellets 22 are added to the former that houses the cooked cereal grain mixture. In the exemplary embodiment, the rice pellets are fed to the former through a feeder, but they may be fed by any method known in the art. The plurality of rice pellets 22 may be of the same color or flavor, or may be a mixture of varying colors, flavors, or other additive induced rice pellets to create a more visually appealing or multi-flavored flake.

The plurality of rice pellets 22 are mixed into the cooked cereal grain mixture 24 to create a multicomponent mixture having the rice pellets 22 embedded within the cooked cereal grain mixture 24. The plurality of rice pellets make up from about 1-60% by weight of the final product. A multicomponent pellet having a plurality of rice pellets 22 embedded within the cooked cereal grain is then formed from the multicomponent mixture in step 58. The multicomponent pellet is cut from the multicomponent mixture at the exit of the former.

The plurality of multicomponent pellets are than dried to a moisture content of about 20-25% by weight. In the exemplary embodiment, the dryer is a flat bed dryer that is used to flash off moisture from the surface of the multicomponent pellets to form a skin over the plurality of pellets. As a result of this drying step, the flakes will not stick during flaking. The multicomponent pellets may be dried by any method known in the art. Optionally, the plurality of multicomponent pellets may then be sized to a desired shape and size. The plurality of pellets may be sized by any method of sizing pellets known in the art.

In step 60, the flake 20 is formed from the multicomponent pellet. In an exemplary embodiment, the flakes 20 are formed with a flaking machine. The flaking machine may be a flaking mill having counter rotating mills or any flaking machine known in the art of flaking.

Next in step 62, the flake 20 is heated to create a multi-textured flake 20. Heating includes, baking and toasting, or any other method of heating known in the art. The multi-textured flake has a moisture content from about 2-5% following heating. In the exemplary embodiment, an oven, such as a Jetzone oven, is utilized to heat the multi-textured flake 20. The oven may be an impingement oven, an infrared oven, or any other oven known in the art. The desired temperature and time range is from about 350-700° F. for about 15 seconds to 3 minutes, preferably from about 400-600° F. for about 30 seconds to 2 minutes. The time at the desired temperature is not as important as the time it takes for each flake to reach the desired temperature range in order to achieve the desired effect. The desired blistering effect is achieved by heating the individual flakes quickly to the desired temperature to facilitate a rapid vaporization of the bound water in the embedded rice pellets starch matrix so that the starch expands quickly. The rapid expansion forms bubbles which are maintained in the finished food because the rapid removal of water down to a moisture content of 5% or less "freezes" the structure in the glassy state.

Prior to heating, the plurality of rice pellets 22 have a moisture content of about 9-13% by weight and the cooked cereal grain have a moisture content of about 20-25% by weight. As a result of mixing the plurality of rice pellets 22 with the cooked cereal grain, the moisture content of the cooked cereal grain with embedded rice pellets 22 is 14-20% by weight. Based on the moisture differential, the plurality of rice pellets 22 expand during heating to create a blistered appearance on the multi-textured flake 20.

Next, the multi-textured flakes 20 may be packaged for delivery. Optionally, prior to packaging the multi-textured flakes 20, the multi-textured flakes 20 may be coated with a flake additive. In an exemplary embodiment, a coating operation may be used in applying the flake additive. A sprayer could be used to apply the flake additive as the multi-textured flakes 20 move along a vitamin belt. The flake additive may include, but is not limited to, frosting, vitamins, edible particulates, flavoring, artificial sweeteners, or coloring. The addition of the flake additive may require a final drying step in order to dry the multi-textured flakes 20 prior to being packaged. The drying of the flake additive may be accomplished by a dryer, exposing the coated flakes 20 to ambient air, or an other method of drying known in the art. Additionally, a final additive may be added to a plurality of flakes prior to packaging. The final additive can include, but is not limited to, dehydrated fruits, nuts, chocolate, or compound coatings.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

The invention claimed is:

1. A method of preparing a multi-textured ready-to-eat cereal flake comprising the steps of:
    forming a plurality of rice pellets having a first moisture content from a rice product;
    forming a cooked cereal grain mixture having a second moisture content greater than the first moisture content;
    embedding the plurality of rice pellets within the cooked cereal grain mixture to create a multicomponent mixture;
    forming a flake from the multicomponent mixture; and
    heating the flake to create a multi-textured flake, wherein the plurality of rice pellets expand to create a blistered appearance on the multi-textured flake.

2. The method as set forth in claim 1 wherein the forming the plurality of rice pellets step is further defined as comprising the steps of:
    disposing rice flour and water into a mixer to from a rice mixture;
    cooking the rice mixture to a moisture content of about 20-30%;
    transferring the rice mixture to a former; and
    forming the rice mixture into the plurality of rice pellets.

3. The method as set forth in claim 2 further comprising the step of adding at least one rice mixture additive to the rice mixture, wherein the at least one rice mixture additive includes at least one of malt, flavoring, coloring, sugar and salt.

4. The method as set forth in claim 2 wherein the cooking the rice mixture step is further defined as cooking the rice mixture in an extruder to a moisture content of about 20-30%.

5. The method as set forth in claim 4 wherein the transferring the rice mixture step is further defined as feeding a rope of the rice mixture from an exit of the extruder to an opening of the former.

6. The method as set forth in claim 2 wherein the transferring the rice mixture step is further defined moving the rice mixture to a former through a tube.

7. The method as set forth in claim 2 further including the step of cutting the rice mixture into a plurality of segments, and wherein the transferring the rice mixture step is further defined as transferring the rice mixture in the plurality of segments to the former on a conveyor.

8. The method as set forth in claim 2 further comprising the step of sizing the plurality of rice pellets to a desired size.

9. The method as set forth in claim 2 wherein the forming step is further defined as forming the rice mixture into the plurality of rice pellets having a moisture content of about 15-20%.

10. The method as set forth in claim 9 further including the step of drying the plurality of rice pellets to a moisture content of about 9-13%.

11. The method as set forth in claim 9 further including the step of drying the plurality of rice pellets to a moisture content of about 10-12%.

12. The method as set forth in claim 1 wherein the plurality of rice pellets are of a different color or flavor.

13. The method as set forth in claim 1 wherein the forming the cooked cereal grain mixture step is further defined as comprising the steps of:
    disposing at least one cereal grain into a cereal grain mixer to form a cereal grain mixture;

cooking the cereal gain mixture to a moisture content of about 20-30%; and transferring the cooked cereal grain mixture to a former.

14. The method as set forth in claim 13 wherein the embedding the plurality of rice pellets within the cooked cereal grain step is further defined as adding the plurality of rice pellets into the former for mixing the plurality of rice pellets into the cooked cereal grain mixture to create the multicomponent mixture having the rice pellets embedded within the cooked cereal grain mixture.

15. The method as set forth in claim 13 further comprising the step of adding at least one cereal grain additive to the cereal grain mixture, wherein the cereal grain additive includes at least one of malt, flavoring, coloring, sugar and salt.

16. The method as set forth in claim 13 wherein the cooking the cereal grain mixture step is further defined as cooking the cereal grain mixture in an extruder to a moisture content of about 20-30%.

17. The method as set forth in claim 16 wherein the transferring the cooked cereal grain mixture step is further defined as feeding a rope of the cooked cereal grain mixture from an exit of the extruder to an opening of the former.

18. The method as set forth in claim 13 wherein the cooking the cereal grain mixture step is further defined as cooking the cereal grain mixture in a rotary cooker to a moisture content of about 20-30%.

19. The method as set forth in claim 13 wherein the transferring the cooked cereal grain mixture step is further defined moving the cooked cereal grain mixture to the former through a tube.

20. The method as set forth in claim 13 further including the step of cutting the cereal grain mixture into a plurality of segments, and wherein the transferring the cooked cereal grain mixture step is further defined as transferring the cooked cereal grain mixture in the plurality of segments to the former on a conveyor.

21. The method as set forth in claim 13 wherein the at least one cereal grain includes at least one of wheat, corn, rice and barley.

22. The method as set forth in claim 1 further comprising the step of applying a flake additive to the multi-textured flake, wherein the flake additive includes at least one of vitamins, flavoring, artificial sweeteners, sweeteners and frosting.

23. The method as set forth in claim 22 further comprising the step of drying the flake additive.

24. The method as set forth in claim 1 wherein the heating the flake step is further defined as heating the flake in an oven to create a multi-textured flake.

25. The method as set forth in claim 1 further comprising the step of forming a multicomponent pellet from the multicomponent mixture prior to the forming a flake step.

26. The method as set forth in claim 25 further comprising the step of drying the multicomponent pellet prior to the forming the flake step.

27. The method as set forth in claim 25 wherein the forming a multicomponent pellet step is further defined as cutting a multicomponent pellet from the multicomponent mixture.

28. A multi-textured ready-to-eat cereal flake comprising:
a plurality of rice pellets of a rice product, said plurality of rice pellets having a first moisture content prior to heating, and wherein said rice product is a rice flour; and
a cooked cereal grain having a second moisture content greater than said first moisture content prior to heating, said plurality of rice pellets being embedded within said cooked cereal grain prior to heating, and wherein said rice pellets expand during heating to create a blistered appearance on the multi-textured flake.

29. The multi-textured ready-to-eat cereal flake as set forth in claim 28 wherein said cereal grain includes at least one of wheat, corn, rice and barley.

30. The multi-textured ready-to-eat cereal flake as set forth in claim 28 wherein said plurality of rice pellets have a moisture content of about 9-13% prior to heating and said cooked cereal grain has a moisture content of about 20-25% moisture prior to heating.

31. The multi-textured ready-to-eat cereal flake as set forth in claim 28 further including a flake additive disposed on the multi-textured ready-to-eat cereal flake, wherein the flake additive includes at least one of vitamins, flavoring, artificial sweeteners, sweeteners and frosting.

32. The multi-textured ready-to-eat cereal flake as set forth in claim 28 wherein the plurality of rice pellets are of a different color or flavor.

\* \* \* \* \*

UNITED STATES PATENT AND TRADEMARK OFFICE
CERTIFICATE OF CORRECTION

| | | |
|---|---|---|
| PATENT NO. | : 8,039,037 B2 | Page 1 of 1 |
| APPLICATION NO. | : 12/414110 | |
| DATED | : October 18, 2011 | |
| INVENTOR(S) | : James Whitham et al. | |

It is certified that error appears in the above-identified patent and that said Letters Patent is hereby corrected as shown below:

Column 4, Line 51: "nice" should be -- rice --.

Signed and Sealed this
Tenth Day of January, 2012

David J. Kappos
*Director of the United States Patent and Trademark Office*